United States Patent [19]
Reed et al.

[11] Patent Number: 6,129,190
[45] Date of Patent: Oct. 10, 2000

[54] ONE-WAY OVERRUNNING CLUTCH

[75] Inventors: Martin E. Reed, Chester; William J. Hatcher, Disputanta; Brian D. Klecker, Chesterfield; Danny R. Sink, Chester, all of Va.

[73] Assignee: Means Industries, Inc., Saginaw, Mich.

[21] Appl. No.: 09/415,146

[22] Filed: Oct. 8, 1999

Related U.S. Application Data

[63] Continuation of application No. 08/757,097, Dec. 6, 1996, Pat. No. 5,964,331.

[51] Int. Cl.[7] ........................................... F16D 41/12
[52] U.S. Cl. ..................... 192/46; 192/45.1; 192/113.32
[58] Field of Search ..................... 192/45.1, 46, 43.1, 192/71, 112, 113.32, 113.33

[56] References Cited

U.S. PATENT DOCUMENTS

| | | |
|---|---|---|
| 5,070,978 | 12/1991 | Pires . |
| 5,449,057 | 9/1995 | Frank . |
| 5,597,057 | 1/1997 | Ruth et al. . |
| 5,699,889 | 12/1997 | Gadd . |
| 5,964,331 | 10/1999 | Reed et al. ............... 192/45.1 X |

*Primary Examiner*—Charles A Marmor
*Assistant Examiner*—Saúl Rodriguez
*Attorney, Agent, or Firm*—Brooks & Kushman P.C.

[57] ABSTRACT

An overrunning clutch assembly including first and second ring-shaped clutch members with face surfaces disposed in opposing relation and with at least one rigid strut disposed therebetween for movement to engage recessed pockets in the opposed surfaces upon rotation in one direction and for movement out of engagement with the pockets in at least one of the face surfaces upon relative rotation in the opposite direction. A retaining member permanently retains the clutch in assembled relation and cooperates with the ring-shaped clutch members to form a lubricant reservoir maintaining the struts in a lubricant bath during operation. The retaining member forms a weir over which the lubricant flows from the reservoir at a radial location to assure that the struts remain submerged during operation.

14 Claims, 4 Drawing Sheets

ONE-WAY OVERRUNNING CLUTCH

CROSS-REFERENCE TO RELATED APPLICATION

This is a continuation of U.S. application Ser. No. 08/757,097 filed Dec. 6, 1996 is now U.S. Pat. No. 5,964,331.

BACKGROUND OF THE INVENTION

1. Field of the Invention

This invention relates to one-way drive, overrunning clutch mechanisms, and more particularly to an improved lightweight, one-way clutch of simplified construction and high torque transmitting capability which is especially well adapted for high speed operation.

2. Description of the Prior Art

One-way drive overrunning clutch mechanisms, hereinafter generally referred to as clutches, or as overrunning clutches, are well known and widely used in a variety of applications ranging from low speed devices such as bicycle drives to high speed mechanisms such as automotive transmissions and torque converters. Commercial clutches employed in high speed automotive transmissions have in the past generally been of the sprag-type or the roller-ramp type, both of which depend on a wedging action to lock up, or to transmit torque between the driving and driven members of the clutch. The wedging action of these clutches produces extremely high stresses in component parts, and the clutches are relatively heavy and expensive to manufacture. Such clutches generally are considered the weakest link in an automatic transmission.

Clutches are also known which employ rigid struts positioned between the driving and driven clutch members, or clutch plates, for pivotal movement between a driving position engaging shoulders defined by notches in the driving and driven clutch plates to transmit torque therebetween upon relative rotation in one direction and to permit overrunning, or free wheeling, upon relative rotation in the opposite direction. Clutches of this type are disclosed, for example, in U.S. Pat. Nos. 5,070,978 and 5,449,057.

In the typical strut-type clutch, the individual struts are mounted for pivotal movement between a driving position in which opposed ends, or opposed edges of at least one strut engages a shoulder formed by notches in closely spaced, opposed faces of the driving and driven clutch plates upon rotation of the driving member in one direction and a retracted position in which the struts are out of engagement with at least one of the clutch plates when the driving member is rotated in the opposite direction relative to the driven member. The struts may be pivotally mounted on a carrier disposed between the clutch faces as in U.S. Pat. No. 5,449,057, but in most commercial drives of this type, the struts are carried in a pocket in one clutch plate face with one end or edge continuously contacting a shoulder defined by the pockets. Whether supported by a carrier or mounted in a pocket in one of the clutch faces, the individual struts are continuously urged to a position to engage both clutch faces by a resilient member, typically a spring, to thereby lock the two clutch plates together upon rotation of the drive member relative to the driven member in one direction. Upon relative rotation in the opposite, or overrunning direction, the spring members continue to urge the struts into contact with the clutch faces and tend to urge the struts into each of the pockets as they are rotated, with the shape of the pockets camming the struts back as rotation continues.

As suggested in the above-mentioned U.S. Pat. No. 5,449,057, the previous overrunning clutches used in high speed transmission mechanisms have required a continuous supply of lubrication to assure that the struts, sprags, or rollers are continuously coated to minimize wear, particularly when the clutch is operated in the overrunning mode. When such clutches are employed in mechanisms such as automatic transmissions containing a reservoir of lubricant which is continuously splashed throughout the interior of the mechanism by the various rotating components, this more or less random distribution of lubricant has been relied upon to lubricate the clutches. It has been discovered, however, that such systems do not always provide adequate lubrication to minimize wear and to enable the most efficient operation, especially in the overrunning mode.

It has been shown that pivotal movement of the struts of strut-type clutches can be effectively damped at high speeds by maintaining the struts submerged in a bath of lubricating oil so that they remain essentially stationary in the overrunning mode. This substantially eliminates rapid depression and expansion of the resilient spring members engaging each strut as the strut passes over the respective recesses in the adjacent clutch face and thereby greatly increases the spring life by effectively eliminating fatigue failures. Further, by maintaining the struts substantially fully submerged in a bath of lubricating oil during all high speed operations, direct metal-to-metal contact between the struts and clutch faces is avoided by the continuous coating of lubricant.

The above-mentioned U.S. Pat. No. 5,070,978 discloses the concept of providing a housing, with seals between the housing and input shaft, to enclose the clutch plates. The sealed housing is filled with oil to assure continuous lubrication to "float" the two opposed clutch plates away from one another during free wheeling or overrunning. This patent also seems to recognize, at column 8, lines 10–12, that filling the housing with oil may have an effect on strut movement during overrunning at high speed, although the patent also states that the struts "hardly move at all" at high speeds even without filling the housing with oil. The housing comprises a generally cup-shaped, output shell having an open end which is closed by a threaded closure plate. The use of a separate housing and threaded closure greatly increases the cost of the clutch, and presents the potential for failure in the event of the threading connector becoming loose during prolonged use. Further, no provision is made for replenishing the oil supply in the event of seal failure, thereby presenting the potential for excessive wear, overheating and eventual failure of the clutch in the event of oil escaping from the sealed housing. The sealed housing would act as a shield effectively preventing splashed oil from reaching the struts in the event of seal failures. Further, the separate housing and threaded closure greatly increases the overall weight and size of the clutch assembly.

Accordingly, it is an object of the present invention to provide an improved lightweight strut-type overrunning clutch assembly having improved means for assuring continuous lubrication for the clutch components.

Another object is to provide such a clutch assembly which assures that the movable struts are continuously submerged in a reservoir of oil during high speed operation regardless of the attitude of the mechanism in which the clutch is used.

Another object is to provide such a clutch assembly having an improved lightweight retaining means retaining the clutch plates in assembled relation and providing an oil-tight joint with one of the clutch members and serving as a weir or dam to retain a reservoir of oil under pressure from centrifugal force between the clutch plates and enveloping the struts and spring members during high speed operation.

Another object is to provide such a clutch assembly including means for providing a continuous flow of oil through the clutch assembly during operation.

Another object is to provide such a clutch assembly which is less expensive to manufacture and which is highly reliable in operation.

SUMMARY OF THE INVENTION

The foregoing and other objects and advantages are achieved in accordance with the present invention in which a plurality of rigid struts are disposed between adjacent, opposed, relatively rotatable faces on a pair of clutch plates for pivotal movement between an engaged position in which at least one strut is rotated to a position engaging a shoulder on both clutch faces to thereby interlock the two clutch plates for rotation together about a common axis in one direction, and a disengage or overrunning position permitting free relative rotation of the clutch plates in the opposite direction. The first clutch plate has an axially extending outer rim portion and a radially inwardly extending integrally formed body portion at one end of the outer rim portion. The second clutch plate also has a substantially radially extending body portion having an outer periphery telescopingly received in the axially extending rim portion of the first clutch plate and preferably has an integrally formed axially extending inner hub telescopingly received in the inner periphery of the first clutch plate with the first and second clutch plates cooperating to define a cavity therebetween. A plurality of struts are mounted in the cavity between the first and second clutch plates for pivotal movement between the engaged or driving position and a disengaged or overrunning position. In the preferred embodiment of the invention, the clutch faces are generally flat parallel annular clutch surfaces similar to the arrangement shown in the above-mentioned U.S. Pat. No. 5,070,978 and in FIGS. 15–27 of copending application Ser. No. 08/382,070 now U.S. Pat. No. 5,597,057.

In the preferred embodiments, the annular rim on the first clutch plate extends axially beyond the body portion of the second clutch plate, and an inwardly directed annular groove is formed in the outer rim portion of the first clutch plate at a location outboard of but immediately adjacent to the body portion of the second clutch plate member. An annular retainer is rigidly fixed in the annular groove and overlying the surface of the second clutch plate to firmly retain the first and second clutch plates in assembled relation. The retainer preferably is initially formed as a continuous annular ring of metal which has a body portion shaped into a generally frustoconical or Belleville washer configuration, and which is then press formed into a substantially flat, planar configuration to expand its outer periphery into the annular groove and to overlie and engage the radially extending body portion of the second clutch plate.

The annular groove and the outer peripheral portion of the retainer are dimensioned such that, upon installing the retainer, the groove engages and swages the retainer edge to conform to the groove geometry and form a fluid tight seal. The inner periphery of the retainer extends radially inward to a location at least substantially equal to the location of the radial innermost part of the rigid struts but outboard of the inner periphery of the body portion of the outer clutch plate. The radially inwardly extending body portion and the outer rim portion of the first clutch plate member and the retainer cooperate to form a generally toroidal, inwardly open enclosure or annular trough surrounding the cavity between the two clutch plates and the outer rim portion of the second clutch plate.

An oil supply passage is provided to deliver lubricating oil into the cavity between the opposed clutch faces to provide lubrication for the component parts and to essentially fill the cavity between the clutch faces. Upon rotation of the clutch, centrifugal force acting on the lubricating oil will retain the oil in the toroidal space; thus, as soon as this space is filled with lubricating oil, it will remain filled and under pressure for so long as the clutch continues to rotate at a speed sufficient for the centrifugal force to overcome the force of gravity, regardless of the orientation of the clutch.

Centrifugal force will cause the oil to flow between the outer periphery of the second clutch plate body and the first clutch plate rim, then along the retainer to flow over the edge of the retainer which acts as a weir, assuring that the struts are continuously submerged in a body of pressurized lubricating oil. Preferably, the inner periphery or hub of the second clutch plate and the outer rim portion of the first clutch plate are formed with splines, or gear teeth for cooperating with mating splines or gear teeth on a driving and driven member for the transfer of power upon rotation in one direction only. In a preferred embodiment, oil may be supplied through a drilled passage in a mounting shaft or gear to an annular oil ring communicating with the cavity between the first and second clutch faces as by a drilled oil passage formed in the second clutch plate hub.

BRIEF DESCRIPTION OF THE DRAWINGS

The foregoing and other features and advantages of the invention will be apparent from the detailed description contained hereinbelow, taken in conjunction with the drawings, in which.

DESCRIPTION OF THE PREFERRED EMBODIMENTS

Figure 1:
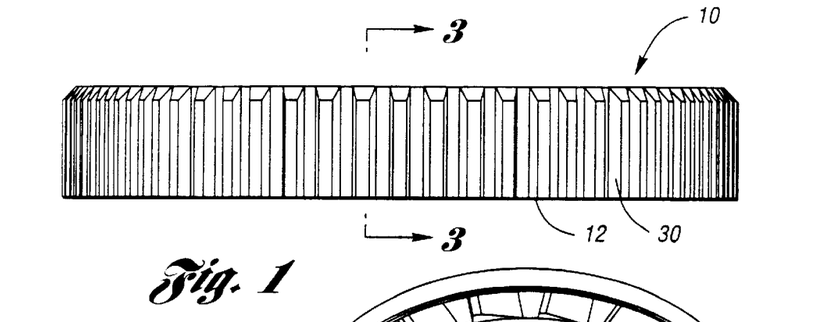
FIG. 1 is an elevation view of a clutch assembly according to the present invention.
Figure 2:
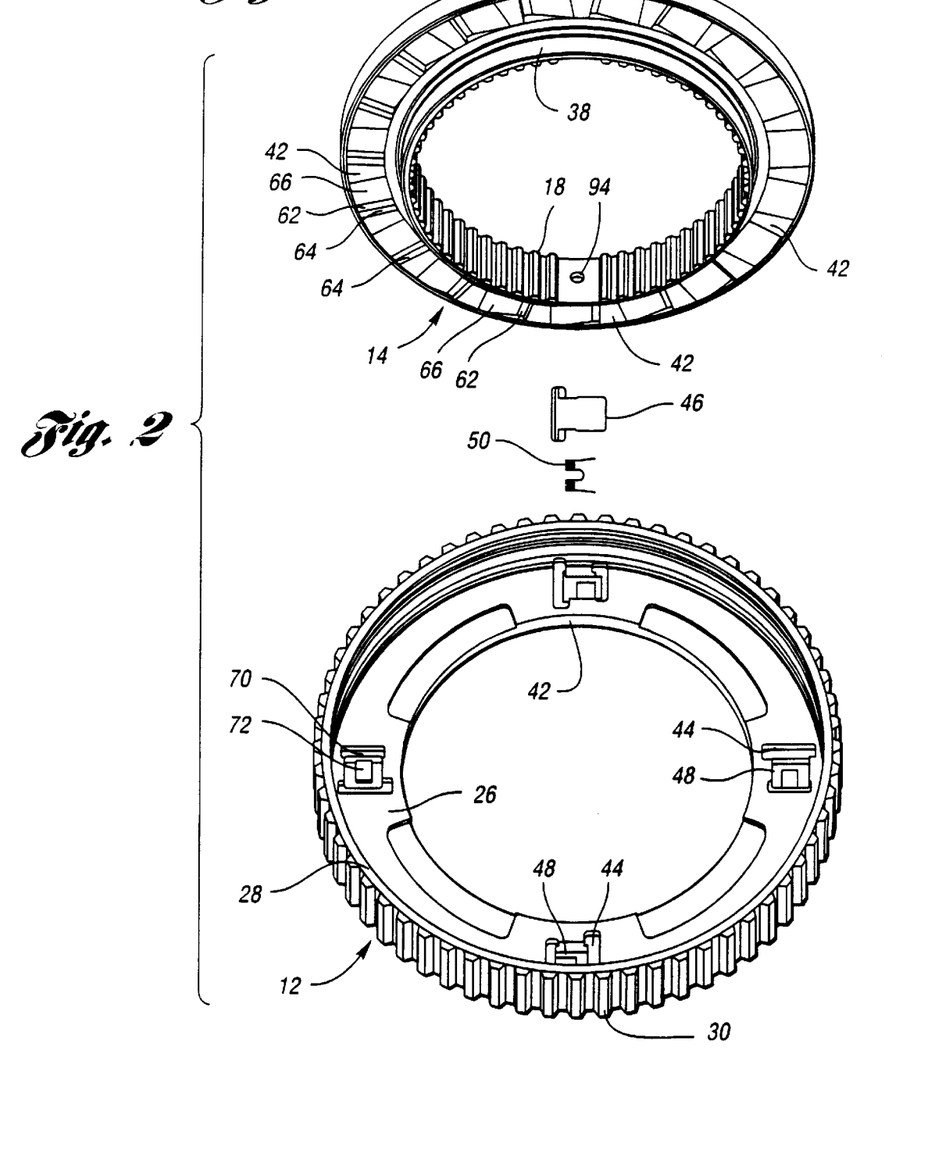
FIG. 2 is an exploded view of the clutch assembly shown in FIG. 1, with certain parts being omitted for clarity.
Figure 3:
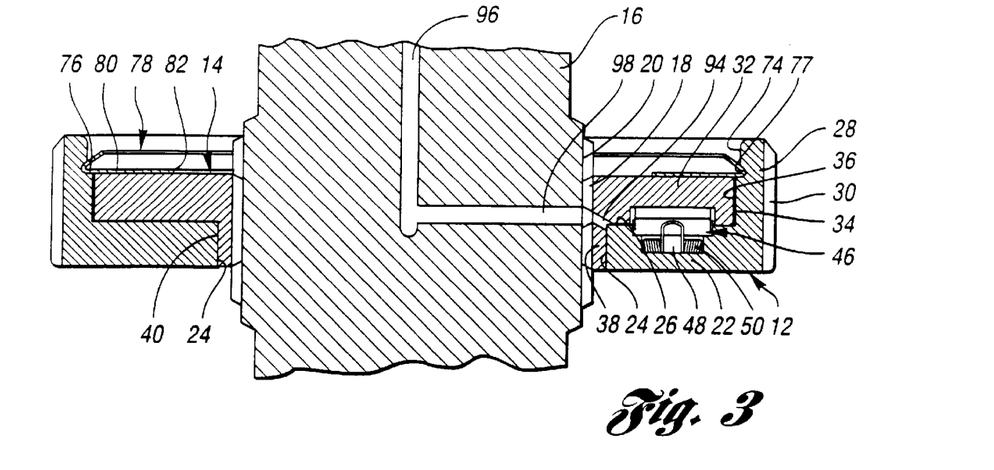
FIG. 3 is a sectional view taken on line 3—3 of FIG. 1, with certain elements shown to a different scale for clarity.

Referring now to the drawings in detail, a clutch assembly according to the present invention is indicated generally by the reference numeral 10 and includes an outer clutch member or clutch plate 12 and an inner clutch member or clutch plate 14. The clutch 10 is illustrated in FIG. 3 as mounted on a driven shaft 16 and supported against rotation thereon by gear teeth 18 on the inner periphery of inner clutch plate 14, which gear teeth mate with splines 20 on the outer periphery of shaft 16.

The outer, clutch plate 12 includes a ring shaped body portion 22 having a cylindrical inner peripheral surface 24 and a planar, annular inner surface 26, and an outer rim portion 28 extending axially from planar inner surface 26. Gear teeth, or splines 30, are formed around the outer periphery of outer rim portion 28 for engaging with mating gear teeth on a drive gear, not shown.

The inner clutch plate 14 also includes a generally ring shaped body portion 32 having a cylindrical outer peripheral surface 34 dimensioned to fit closely within the cylindrical inner surface 36 of outer rim portion 28 and has on its inner peripheral portion an axially extending hub 38 having an outwardly directed cylindrical surface 40 dimensioned to telescopingly receive the inner peripheral surface 24 of the outer clutch plate 12. The inner clutch plate's body portion 32 also has a planar inner surface 42 disposed in closely spaced, parallel relation to the outer clutch plate's planer inner surface 26 when the clutch is assembled.

The planar inner surface 26 of outer clutch member 12 has a plurality of recesses 44 formed therein with each adapted to receive a strut or key 46. Each recess 44 further includes a secondary recess 48 for receiving a spring 50.

Figure 6:
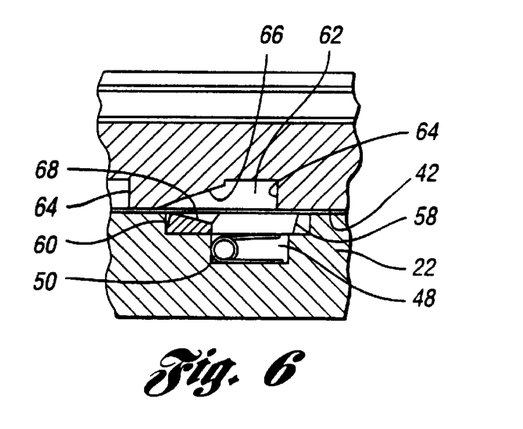
FIG. 6 is a view similar to FIG. 5 and showing the clutch in an overrunning condition.
Figure 7:
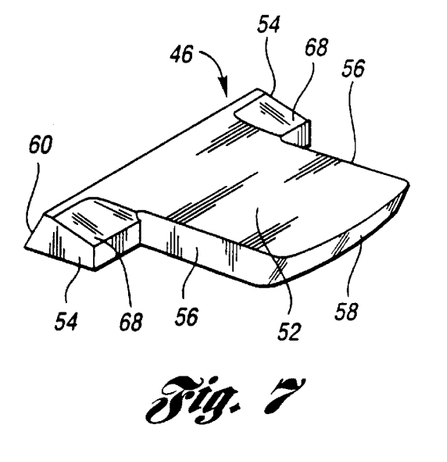
FIG. 7 is a perspective view, on an enlarged scale, of a rigid strut employed in the clutch.
Figure 8:
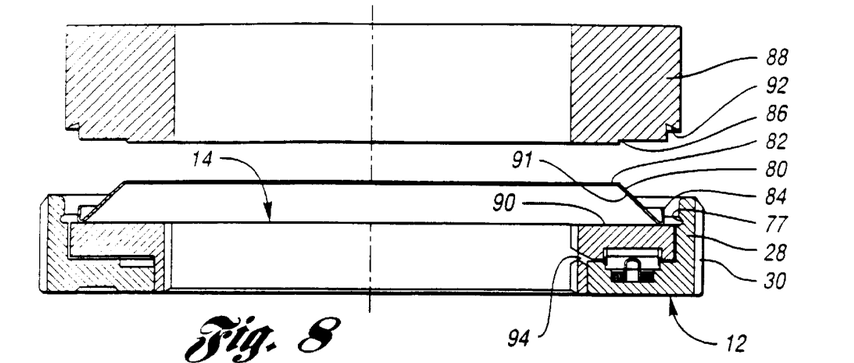
FIG. 8 is a sectional view showing the clutch in partially assembled relation with the rigid retainer in position to be installed.
Figure 9:
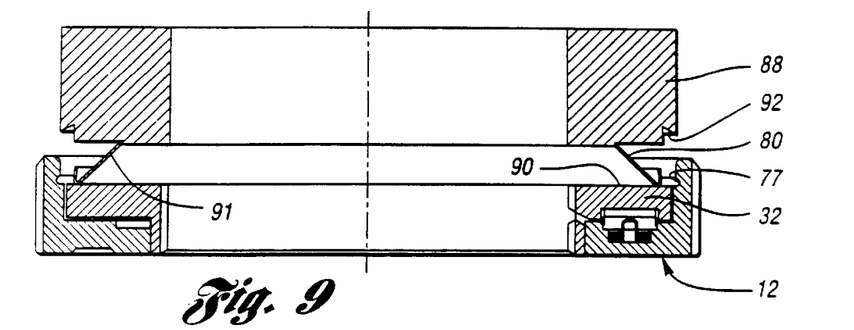
FIG. 9 is a view similar to FIG. 8 and showing a die member for installing the rigid retainer.
Figure 10:
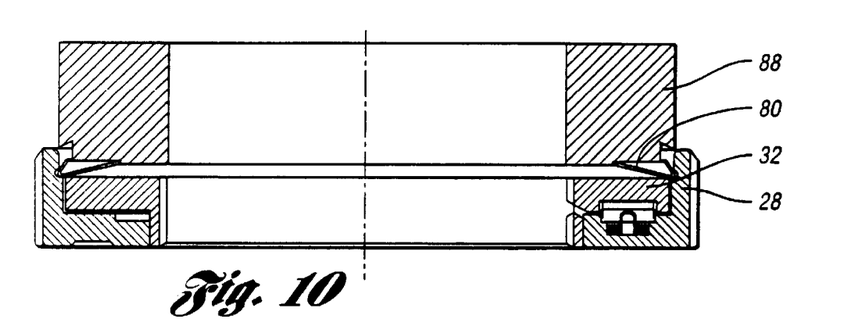
FIG. 10 is a view similar to FIG. 9 showing the retainer partially installed.
Figure 11:
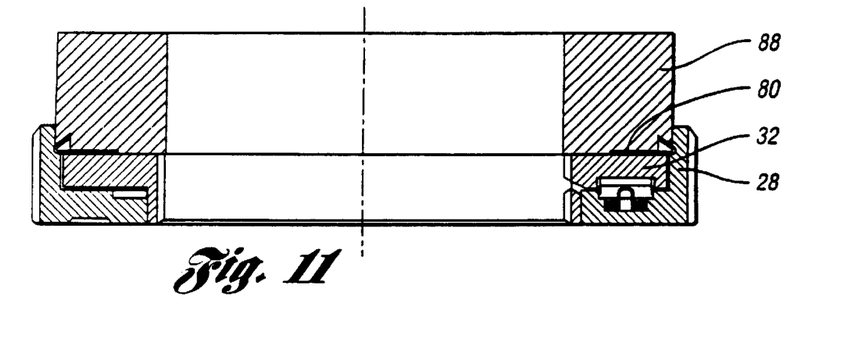
FIG. 11 is a view of the fully assembled clutch with the die illustrated in final assembly position.

As best seen in FIG. 7, the key 46 includes a rigid, generally rectangular body 52 with laterally extending wings 54 projecting one from each side edge 56 of the body adjacent one end thereof. The front end of body 52, i.e., the end opposite the end having wings 54 formed thereon, may be a substantially, flat planar surface inclined slightly with respect to the opposed planar surfaces of body 52, but preferably is slightly curved, as shown at 58 in FIG. 7. The back end 60, i.e, the end opposite and generally parallel to end 58 is a flat planar surface inclined with respect to the faces of body 52 at an angle generally corresponding to the angle of inclination of the end 58. The angle of inclination of the ends 58, 60 corresponds to the maximum angle of inclination or movement of the key from the engaged or driving position projecting into a recess 44 as shown in FIG. 5 and the retracted or overrunning position withdrawn from the recess 44 as shown in FIG. 6.

The planar annular surface 42 of inner clutch plate 14 is provided with a plurality of key-engaging notches 62 providing a ring of abutment faces or shoulders 64 in position to be engaged by the end 58 of one of the keys 46 in the driving mode. Notches 62 may have a sloped or inclined rear portion 66. As stated above, the front end 58 may be a flat planar surface but preferably is slightly arcuate, with the degree of curvature being exaggerated in FIG. 7 for illustrative purposes. When the end 58 is arcuate, the shoulders 64 will also be correspondingly curved so that, in the engaged position, the ends 58 and shoulders 64 will be in contact along the full length of end 58. At the same time, the slightly arcuate configuration permits sufficient adjustment or movement of the key, under load, to accommodate any slight misalignment which might occur due to manufacturing tolerances, thereby eliminating or minimizing stress concentrations which could be produced as a result of such misalignment. Also, as seen in FIGS. 5–7, the wings 54 preferably are provided with an inclined ramp portion 68 to permit free tilting of the key, under influence of the springs 50 to project the body 52 into a recess 44 as shown in FIG. 5. To facilitate the free flow of lubricating oil into the recesses 44 and subrecesses 48, each recess 44 preferably includes a relief 70 and a similar relief 72 is preferably formed at one end of each subrecess 48.

As thus far described, the structure of the clutch assembly, including the outer clutch plate 12, the inner clutch plate 14, the driving keys, and the resilient springs, may be substantially identical to that disclosed and described in copending application Ser. No. 08/382,070 now U.S. Pat. No. 5,597,057, with the single exception of the preferred arcuate configuration of the key end 58 and the driving notch shoulder 64.

Figure 5:
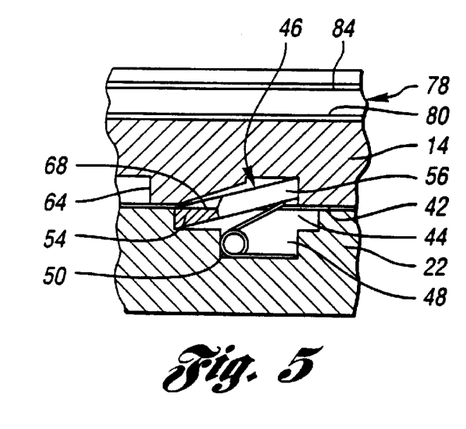
FIG. 5 is a fragmentary sectional view taken on line 5—5 of FIG. 4.

As in the clutch assembly described in the above pending application, when the outer clutch plate 12 is rotated in the driving direction, i.e., to the right in FIG. 5, the spring 50 will urge the key 46 into the notch 62 so that the front end 58 of one key 52 will engage the shoulder 64 of that notch 62. Resistance to movement of the inner clutch plate 14 acting through the key end 58 and shoulder 64 will tend to cam the key into full engagement with the shoulder, thereby assisting the spring 50 in projecting the key fully into the notch.

When the outer clutch plate 12 is rotated in the opposite direction, i.e., to the left in FIG. 6, or when the inner clutch plate 14 tends to rotate faster than the outer clutch plate 12, the inclined surface 66 of notch 62 will cam the key back into the recess 44 to the overrunning position. In this overrunning condition shown in FIG. 6, it is desirable that the recesses 44, subrecesses 48, and notches 62 be completely filled with a lubricating oil to dampen movement of the keys as successive notches 62 pass over the respective keys, thereby preventing the springs 50 from projecting the keys into the notches only to be driven back by impact with the inclined notch surfaces 66. In accordance with the present invention, this supply of pressurized oil completely submerging the body 52 of each key is assured during normal operation of the clutch assembly.

Figure 4:
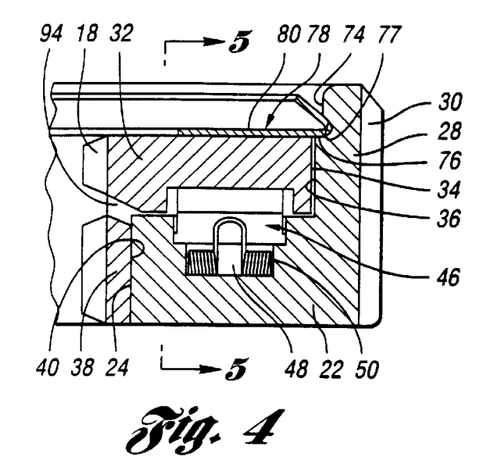
FIG. 4 is an enlarged fragmentary sectional view of a portion of the structure show n in FIG. 3.

Referring now to FIGS. 3 and 4, it is seen that the outer rim portion 28 of the outer clutch plate 12 is provided at its open end with a counterbore providing a cylindrical surface 74 having a diameter greater than the diameter of cylindrical surface 36 and terminating in a planar annular shoulder 76 lying in a plane parallel to the planar inner surface 26. A generally V-shaped annular groove or notch 77 is formed in the cylindrical wall 74 adjacent the shoulder 76, and a retainer 78 is pressed into and forms a fluid-tight seal with the groove 77 around its entire periphery. In the preferred embodiment of the invention as shown in FIGS. 1–11, the retainer as initially formed (see FIG. 8) has a generally frustoconical ring-shaped body portion 80 having an annular inner peripheral edge 82 and a generally axially extending flange 84 integrally formed on its outer edge. The outer diameter of flange 84 is greater than the diameter of cylindrical surface 36 and slightly less than the diameter of cylindrical surface 74.

As shown in FIGS. 8–11, the generally frustoconical retainer 78 is initially positioned in the counterbore 74 with the flange 84 adjacent the V-shaped groove 77 and with the frustoconical body portion 80 having its inner peripheral edge 82 projecting outwardly from the end of hub 38. The inner peripheral edge 82 of the retainer is then engaged by a shoulder 86 on an axially movable die element 88 which is moved downward to compress the retainer and form its major diameter outwardly and into the V-shaped groove 77. Final movement of the die 88 conforms the axially extending flange portion 84 of retainer 78 firmly into the groove 77 and shapes the body portion 80 into a substantially planar, annular ring overlying the outer surface 90 of inner clutch plate 14.

During press forming of the retainer 78, the inner peripheral edge is retained against radial shrinking by the shoulder 86 on die 88. Also, during the final movement of die 88, an annular notch 92 engages the end of flange 84 to swage the retainer to conform to the geometry of the groove 77 and form a fluid tight seal therewith.

The minor diameter of the retainer, in the installed position, extends radially inward to a at least overlying the body portion 52 of the keys 46 but radially outboard of the outer clutch plate's inner peripheral surface 24. Thus, the retainer 78, the outer rim portion 28, and the body portion 22 of the outer clutch plate 12 define, in effect, a generally toroidal-shaped, annular cavity containing the keys 46, springs 50, the recesses 44 and subrecesses 48, as well as the notches 62 formed in the planar inner surface 42 of the inner clutch plate 14.

Referring again to FIGS. 3 and 4, it is seen that an oil supply passage 94 extends through the hub 38 and terminates at the intersection of surfaces 42 and 40. Oil, under pressure, may be supplied to the passage 94 through oil supply passages 96, 98 in shaft 16. Although in the static position as shown in FIG. 3, the planar inner surfaces 26 and 42 may be in direct contact, the clutch plates are dimensioned so as to provide some finite clearance between these surfaces during operation so that a film of oil will be present and oil can flow from passage 94 between these surfaces and into the recesses 44 and 48 and the notches 66. The separation of surfaces 26 and 42 is shown somewhat exaggerated in FIGS. 4–6 to illustrate the oil flow passage. Also, a film of oil will be present between opposing cylindrical surfaces 24 and 40 as well as between cylindrical surfaces 34 and 36 to permit restricted flow and to provide lubrication and avoid direct metal-to-metal contact of these surfaces during operation.

During high speed operation, oil in the recesses and notches will surround the keys 46 and be pressurized both by centrifugal force and the pressure of oil flowing through passage 94 from passages 96, 98 and will cause a continuous flow of oil into and through these recesses and notches, and outwardly between surfaces 34 and 36 and along the opposing outer surface 90 of inner clutch plate 14 and the inner surface 91 of the retainer 78. The inner peripheral edge 82 of retainer 78 extends along surface 90 to a position radially between the hub 38 and the radially inner portion of the body 52 of keys 46 and acts as a weir to permit a continuous restricted outward flow of lubricating oil over edge 82 while maintaining the keys submerged in oil during operation.

Since the retainer 78 is rigidly and permanently fixed in the V-shaped groove 77, and forms a fluid-tight seal therewith, the clutch plates 12, 14 are continuously maintained in a fixed, spatial relation, with a continuous supply of lubricating oil to all opposing relatively moving surfaces during normal operation. The permanent, interlocked pressure-formed joint between the retainer and the V-shaped notch assures against channeling of lubricating fluid and/or the loss of fluid as a result of improper fitting or loosening of conventional resilient snap ring or threaded retainers of the type employed in the past.

The retaining element 78 is preferably initially stamped and formed from a flat sheet of a suitable steel material as an annular ring which is shaped into the frustoconical configuration having its outermost peripheral edge portion rolled into a configuration to be pressure formed into and form a seal with the groove 77.

While only a single oil passage 94 is shown in the drawings, it should be apparent that a plurality of such passages may be provided if desired. For example, a plurality of such oil passages may be provided at spaced intervals around the inner periphery of hub 38, with oil supply being provided to each from oil passage 96, 98 in shaft 16 communicating with an annular groove (not shown) extending around the shaft so that each such oil passage 94 will be in continuous communication with a supply of oil under pressure during operation. Alternatively, of course, multiple radially extending oil passages 98 might be provided, one in communication with each such passage 94.

In operation of a clutch constructed substantially as described above, with the inner and outer clutch plates being formed from a transparent, thermoplastic material, it has been shown that lubrication filling the void space between the clutch plates 12 and 14 and maintained under pressure produced from centrifugal force, will substantially completely dampen all movement of the keys 46 when the clutch is in the overrunning mode. A high speed camera operating at 20,000 frames per second used to photograph the keys when operating in the overrunning mode showed that no visibly discernible movement of the keys was present at speeds above about 150 rpm. In this experimental clutch formed from synthetic resin material, the outside diameter of the outer clutch member 12 was 6 inches, and the radial distance from the center of the shaft to the outside edge 56 of the keys was 2.5 inches.

Figure 12:
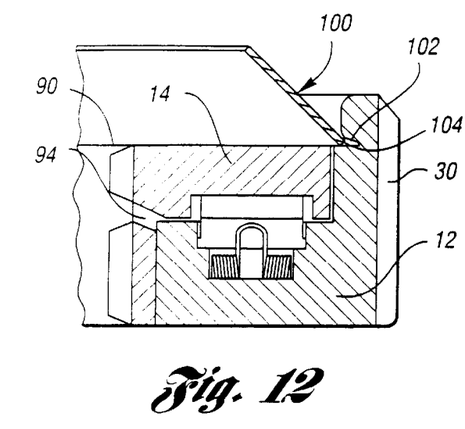
FIG. 12 is an enlarged fragmentary sectional view of an alternate embodiment of the invention with the seal in position to be installed.
Figure 13:
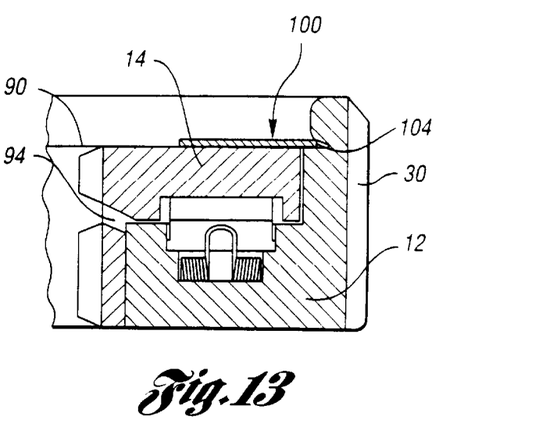
FIG. 13 is a view similar to FIG. 4 and showing the clutch components of FIG. 12 in the fully assembled condition.

Referring now to FIGS. 12 and 13, an alternate embodiment of the invention will be described. In this embodiment, the outer and inner clutch plates, keys and springs are substantially identical to that described above and the same reference numerals are employed herein to designate similar parts. In this embodiment, however, the retainer is initially formed as a frustoconical ring 100 having a substantially uniform thickness throughout. The configuration of the inwardly directed groove 102 formed in the counterbore portion of outer rim portion 28 has a more shallow V configuration than in the previously described embodiment. As shown in FIG. 13, the outer peripheral edge 104 of the retainer 100 is expanded into the groove 102 and swaged into the configuration of the groove by the pressing movement forming the retainer into a substantially flat, planar ring in the manner described hereinabove. Once installed, the clutch assembly is permanently assembled, with the inner peripheral edge thereof acting as a weir in the same manner described above.

Figure 14:
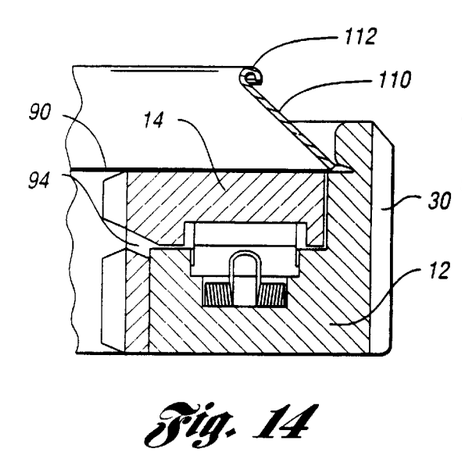
FIGS. 14–16 are fragmentary sectional views, each showing a further embodiment of the invention.

FIG. 14 illustrates a modification of the structure shown in FIGS. 12 and 13 in which the retainer 110 is provided around its inner periphery with a reinforcing or stiffening bead, or flange 112, prior to being press formed into the assembled relation overlying the outer surface 90 of inner clutch plate 14. The reinforcing bead 112 provides stiffness and dimensional stability of the retainer 110 and tends to maintain the inner peripheral portion of the planar body of the retainer member in a more flat or plane condition after installation. It is understood that such a reinforcing bead or flange could readily be provided on the embodiment shown and described above with reference to FIGS. 3 and 4.

Figure 15:
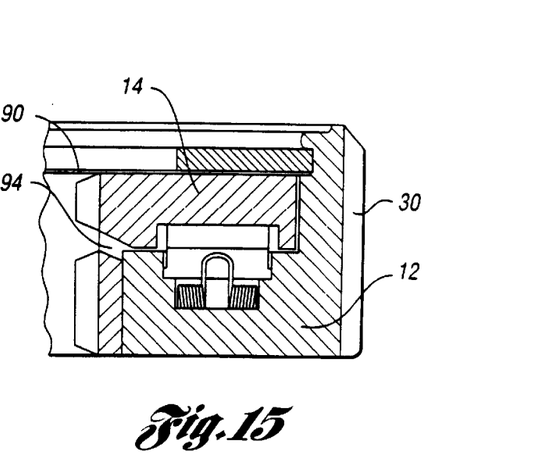

FIG. 15 illustrates an embodiment wherein the retainer 120 is in the form of a rigid, flat washer or ring which is fitted into the counterbore 74 of outer clutch plate 12 to rest upon the shoulder 76. The outer clutch plate 12 may be identical to that described above with respect to FIGS. 3 and 4; however, as illustrated in FIG. 15, the V-shaped notch in the cylindrical wall of the counterbore is preferably eliminated. In this embodiment, the retainer 120 is rigidly retained in position overlying the outer surface 90 of inner clutch plate 14 by a continuous bead 124 of the material formed from the outer rim portion 28 of the outer clutch plate 12 which is deformed by a known pressing operation in which force is applied to the end of outer clutch plate 12 adjacent the counterbore 74. As a further alternative, the bead 124 may be replaced with a succession of tabs (not shown) formed by a staking operation to deform metal from the outer rim portion 28 of outer clutch plate 12 at spaced intervals around the periphery of the retainer 120. In this staked configuration, the outer diameter of the retainer 120 and the inner diameter of the counterbore are preferably dimensioned to provide a press fit with sufficient interference to form a reliable fluid seal to substantially prevent leakage of oil between the outer diameter of the retainer 120 and the counterbore formed in the end of outer clutch plate 12. A similar interference fit may also be employed where a continuous bead 124 of material is deformed as illustrated in FIG. 15.

Figure 16:
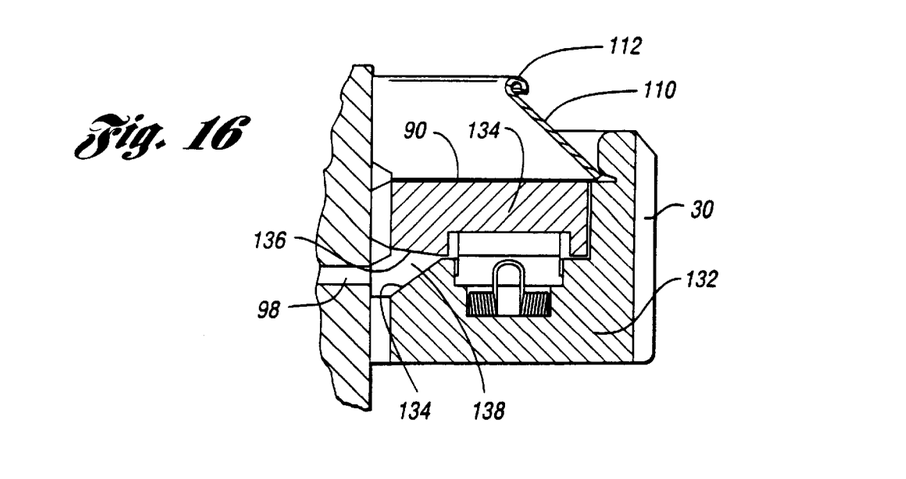

A further modification of the invention is illustrated in FIG. 16 wherein the axially extending inner hub (designated at 38 in the embodiment illustrated in FIGS. 3 and 4) has been eliminated. In this embodiment, outer and inner clutch members 132, 134, respectively, have their opposing inner faces formed with a tapered, or bevelled surface 134, 136, respectively, cooperating to provide a generally V-shaped annular channel 138 around the inner periphery of the clutch assembly. The channel 138 is positioned, in operation, in substantially opposed relation to the discharge outlet of the lubricant channel 98 in shaft 16 whereby, upon rotation of the assembly, lubricant discharged from channel 98 will either be discharged from outlet channel 98 under sufficient pressure or be propelled by its own momentum and the influence of centrifugal force, into the channel 138. From the channel 138, oil flows under influence of centrifugal force between the opposing surfaces 26 and 42 and through the recesses 44, 48, and over the surfaces of the keys 52 to be discharged over the inner periphery of the retaining member, acting as a weir, in the same manner described hereinabove.

The embodiment of FIG. 16 is illustrated as employing the retaining element of the same configuration shown in FIG. 14. It is believed apparent, however, that any of the other configurations of the retaining element may be employed with this embodiment.

In each of the embodiments described above, the two ring-shaped clutch members and the retainer cooperate to form a generally toroidal, inwardly open enclosure or annular trough defining a lubricant flow path extending radially outward between the two clutch members and over the struts or keys, then radially inward between the second clutch member and the retainer. The location of the inner periphery of the retainer enables it to act as a weir for the discharge of lubricant to assure that the struts or keys are continuously submerged during operation. The continuous flow of lubricant acts as a coolant and to flush any foreign matter from the clutch as well as to dampen movement of the struts or keys in the overrunning mode.

While preferred embodiments of the invention have been illustrated and described, it is believed apparent that various modifications might be made and it is therefore intended to include all of the embodiments which would be apparent to one skilled in the art and which come within the spirit and scope of the invention.

What is claimed:

1. A one-way overrunning clutch assembly comprising:
a first clutch member including an annular body portion having a cylindrical inner periphery and an outer periphery defined by an annular rim portion projecting axially from a first side thereof, said rim portion having an inner cylindrical surface including an integrally-formed, radially-inwardly-opening groove that extends only circumferentially therein;
a second clutch member including an annular body portion having a cylindrical outer surface and an inner peripheral surface, the cylindrical outer surface of the body portion of said second clutch member being telescopingly received in the inner cylindrical surface of the rim portion of said first clutch member such that said first and second clutch members have a common central axis;
the first and second clutch members having inner surfaces disposed in spaced opposing relation to one another, each inner surface having a plurality of recesses formed therein to define strut abutment shoulders at spaced intervals thereabout;
a rigid strut having a body portion pivotally supported for movement between a driving position, wherein said strut projects into and engages an abutment shoulder in the inner surface of each of said clutch members to interlock said clutch members for rotation together in one direction, and an overrunning position, wherein said strut is out of contact with the abutment shoulders of the inner surface of at least one of said clutch members to permit free relative rotation between said first and second clutch members in the opposite direction; and
an annular retainer positioned within the inner cylindrical surface of the rim portion of said first clutch member, said retainer having an annular body portion and an outer peripheral edge portion, the annular body portion of said retainer having a first surface overlying at least a portion of the body portion of said second clutch member, and the outer peripheral edge portion of said retainer permanently engaging and forming a fluid-tight seal with the cylindrical inner surface of the rim portion of said first clutch member, the outer peripheral edge portion of said retainer being radially expanded into the groove of the rim portion of said first clutch member.

2. A one-way overrunning clutch assembly comprising:
a first clutch member including an annular body portion having a cylindrical inner periphery and an outer periphery defined by an annular rim portion projecting axially from a first side thereof, said rim portion having an inner cylindrical surface including an integrally-formed, radially-inwardly-opening groove;
a second clutch member including an annular body portion having a cylindrical outer surface and an inner peripheral surface, the cylindrical outer surface of the body portion of said second clutch member being telescopingly received in the inner cylindrical surface of the rim portion of said first clutch member such that said first and second clutch members have a common central axis;
the first and second clutch members having inner surfaces disposed in spaced opposing relation to one another, each inner surface having a plurality of recesses formed therein to define strut abutment shoulders at spaced intervals thereabout;

a rigid strut having a body portion pivotally supported for movement between a driving position, wherein said strut projects into and engages an abutment shoulder in the inner surface of each of said clutch members to interlock said clutch members for rotation together in one direction, and an overrunning position, wherein said strut is out of contact with the abutment shoulders of the inner surface of at least one of said clutch members to permit free relative rotation between said first and second clutch members in the opposite direction; and an annular retainer positioned within the inner cylindrical surface of the rim portion of said first clutch member, said retainer having an annular body portion and an outer peripheral edge portion, the annular body portion of said retainer having a first surface overlying at least a portion of the body portion of said second clutch member, and the outer peripheral edge portion of said retainer permanently engaging and forming a fluid-tight seal with the cylindrical inner surface of the rim portion of said first clutch member, the outer peripheral edge portion of said retainer being radially expanded into the groove of the rim portion of said first clutch member, wherein the body portion of said retainer is deformed axially to effect permanent radially-outward deformation of the outer peripheral edge portion of said retainer into the groove of the rim portion of said first clutch member.

3. The clutch assembly of claim 2, further including a counterbore formed in the rim portion of said first clutch member, the counterbore terminating in a shoulder spaced axially from the inner surface of said first clutch member, the shoulder engaging said retainer to axially fix said retainer relative to the rim portion of said first clutch member.

4. The clutch assembly of claim 2, wherein the rim portion of said first clutch member is deformed to mechanically lock the radially-expanded outer peripheral edge portion of said retainer to said first clutch member.

5. The clutch assembly defined in claim 2, wherein the inner surfaces of said clutch members are substantially planar.

6. An overrunning clutch assembly comprising:

a first clutch member rotatable about an axis and including an inner surface generally normal to the axis and an axially-extending peripheral rim portion, the rim portion of said first clutch member including an integrally-formed, radially-inwardly-opening groove that extends only circumferentially therein;

a second clutch member rotatable about the axis including an inner surface disposed in a spaced opposing relation to the inner surface of said first clutch member, said second clutch member further including an outer surface generally opposite to the inner surface thereof;

an arrangement for coupling said first clutch member with said second clutch member when said first clutch member rotates in a first direction relative to said second clutch member, the arrangement including a plurality of recesses formed in each of the inner surface of said first clutch member and the inner surface of said second clutch member, each of the recesses defining an abutment shoulder, and at least one strut, each strut having a first end for engagement with the abutment shoulders of said first clutch member and a second end opposite the first end for engagement with the abutment shoulders of said second clutch member, each strut including a radially-innermost portion; and an annular retainer having an outer peripheral edge portion permanently engaging the rim portion of said first clutch member, wherein said retainer includes a body portion overlying the outer surface of said second clutch member, and wherein the outer peripheral edge portion of the retainer is radially expanded into the groove to thereby axially secure said retainer within the rim portion of said first clutch member.

7. The clutch assembly of claim 6, wherein the body portion of said retainer is deformed axially to effect radially-outward deformation of the outer peripheral edge portion of said retainer into the groove of the rim portion of said first clutch member.

8. The clutch assembly of claim 6, wherein the rim portion of said first clutch member is deformed to axially mechanically lock the radially-expanded outer peripheral edge portion of said retainer to said first clutch member.

9. The clutch assembly of claim 6, wherein the body portion of said retainer overlies the radially-innermost portion of a shoulder-engaging surface of each strut.

10. The clutch assembly of claim 6, wherein the outer peripheral edge portion of said retainer is in fluid-tight relation with the groove of the rim portion of said first clutch member.

11. The clutch assembly of claim 6, wherein the rim portion of said first clutch member includes an axially-disposed shoulder; and wherein the outer peripheral edge portion of said retainer is radially-expanded into the interior groove by axially press-fitting said retainer into engagement with the axially-disposed shoulder of the rim portion of said first clutch member.

12. The clutch assembly of claim 6, wherein a cavity is defined between the inner surface of said first clutch member and the inner surface of said second clutch member, and wherein at least one of said members includes a lubricant-receiving channel communicating with said cavity such that lubricating oil supplied to said channel flows, under the influence of centrifugal forces, radially outwardly into said cavity, axially between the outer peripheral edge portion of said second clutch member and the inner cylindrical surface of the rim portion of said first clutch member, and radially inwardly between the outer surface of said second clutch member and the body portion of said retainer.

13. The clutch assembly of claim 6, wherein said first clutch member includes an inner cylindrical surface on the rim portion thereof, said second clutch member includes an outer peripheral edge portion, and wherein the outer peripheral edge portion of said second clutch member is telescopingly received within the inner cylindrical surface of said first clutch member.

14. The clutch assembly of claim 6, wherein said first clutch member further includes an inner peripheral edge portion and said second clutch member further includes an inner peripheral edge portion including an axially-projecting hub, the hub having an outer cylindrical surface; and wherein the inner peripheral edge portion of said first clutch member is telescopingly received about the outer cylindrical surface of the hub.

* * * * *